Jan. 3, 1967     P. A. KLANN     3,295,402
PEDAL BOARD FOR ORGANS
Filed May 7, 1965     2 Sheets-Sheet 1
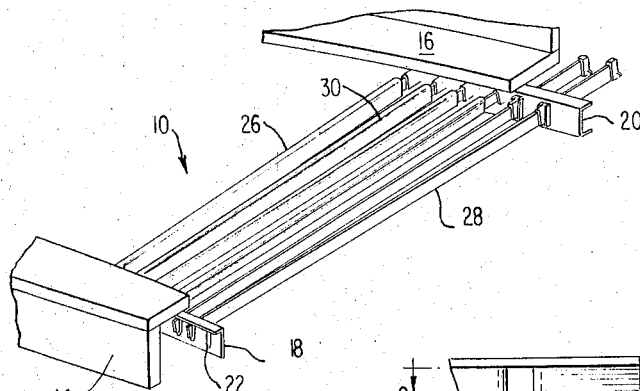
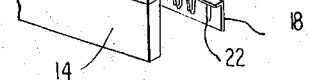
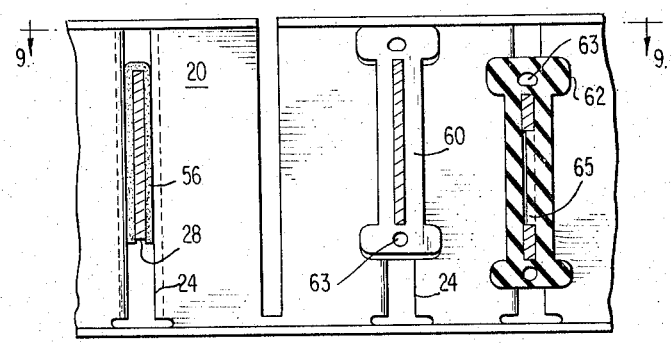
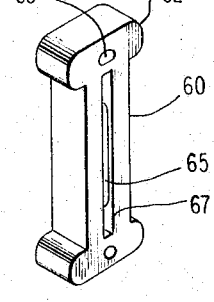
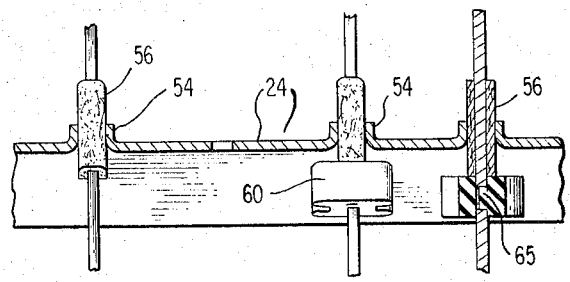
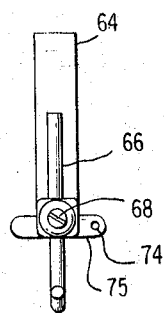
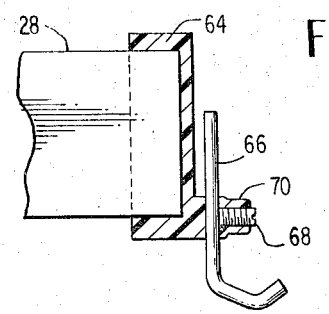
INVENTOR
PAUL A. KLANN
BY Sughrue, Rothwell, Mion, Zinn & Macpeak
ATTORNEYS

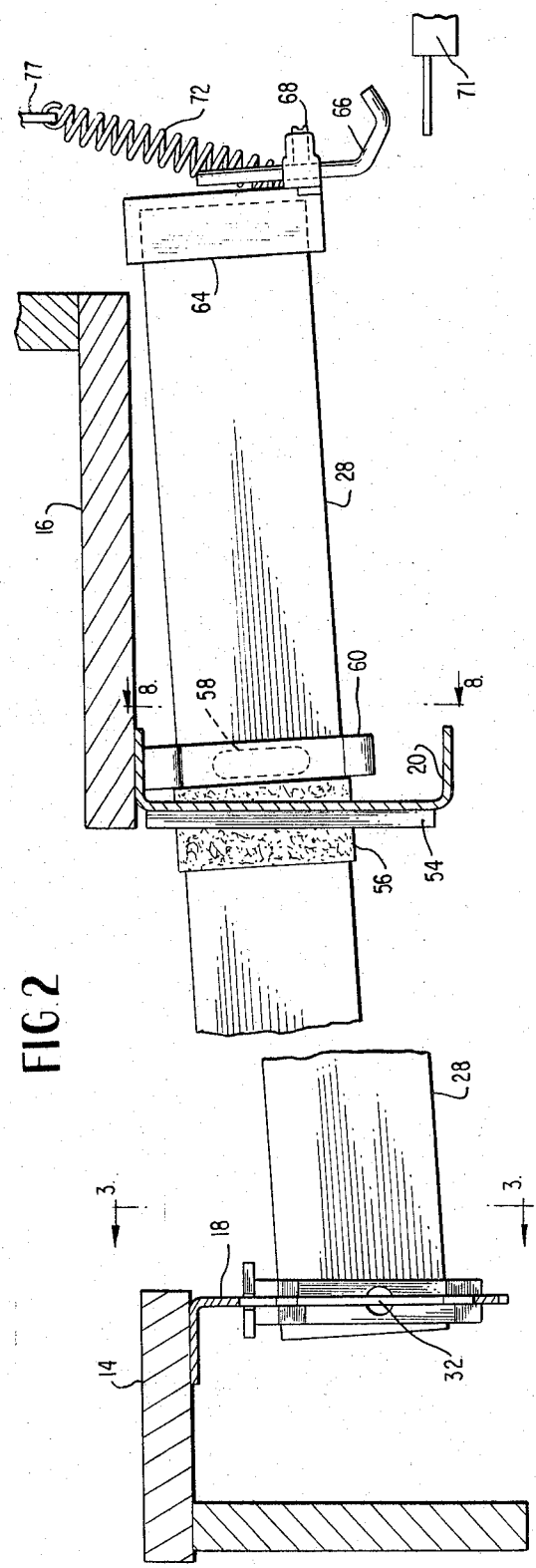
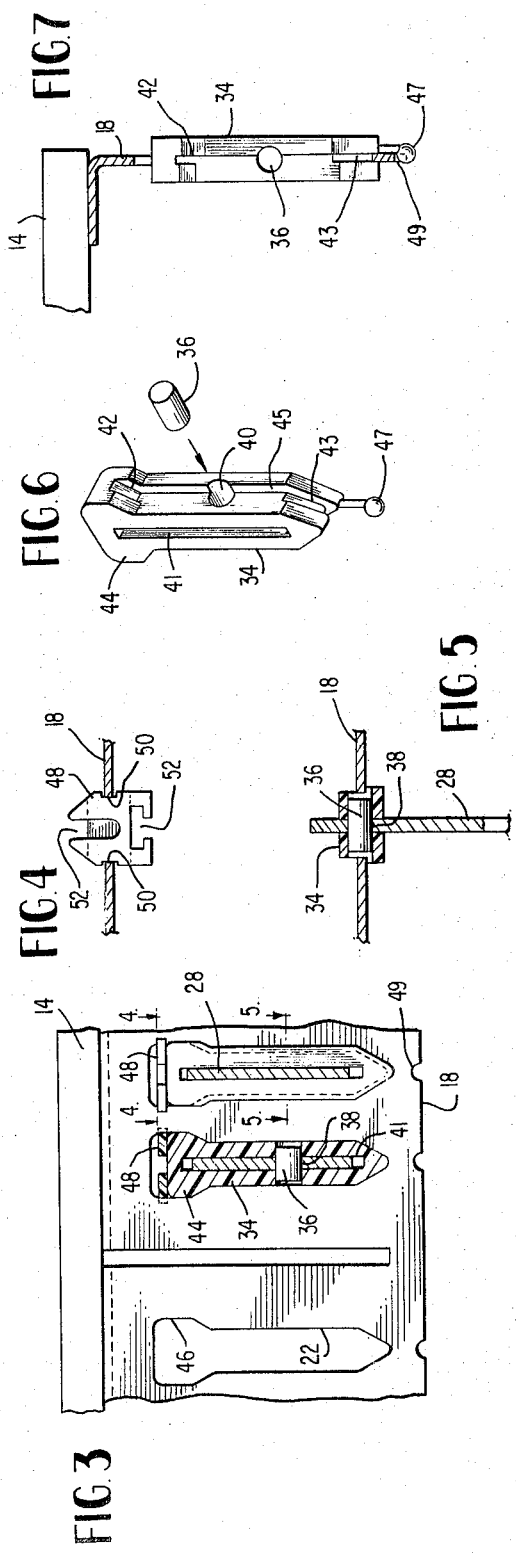

3,295,402
PEDAL BOARD FOR ORGANS
Paul A. Klann, P.O. Box 2398, Waynesboro, Va. 22980
Filed May 7, 1965, Ser. No. 454,003
7 Claims. (Cl. 84—366)

This invention relates to improvements in pedal boards for organs.

Pedal boards for both electronic and pipe organs have conventionally been made of wood and to A.G.O. (American Guild of Organists) specifications. However, in my prior Patent 3,175,447 granted March 30, 1965, I disclose a pedal board for organs using metal supports for the pedal in order to provide an inexpensive manner of accommodating "toe in" and also using a hook shaped rear end of each pedal allowing easy insertion and removal of the pedal keys.

The present invention relates to an improvement on the pedal board described and claimed in my aforesaid patent. In the arrangement for providing for pivotal mounting of the rear end of the pedal keys, a close tolerance and close clearance is required in order to minimize the noise factor. Of course it is highly desirable that the pedals of an organ pedal board be silent in operation. However, in providing the close tolerances for the pivotal mounting of the rear end of the pedal key to eliminate noise, additional expenses due to the close manufacturing tolerances are encountered.

This invention provides a unique pivotal mounting for the rear end of a pedal key of an organ pedal board which is silent, inexpensive to manufacture and install and still allows quick and easy removal of the pedal key.

Additional improvements in the pedal board of this invention include a unique mounting for the actuator attached to the pedal key at the front end, and a novel stop member positioned on the pedal key.

Other objects of the invention will be pointed out in the following description and claims and illustrated in the accompanying drawings, which disclose, by way of example, the principle of the invention and the best mode which has been contemplated of applying that principle.

In the drawings:

FIG. 1 is a partial perspective view and portions broken away of the improved pedal board of this invention;

FIG. 2 is a side sectional elevation view of a single pedal with portions of the guide rails shown in section and portions of the pedal support eliminated for the sake of clarity;

FIG. 3 is a sectional view taken along line 3—3 of FIG. 2, with a portion of a slot liner also shown in section;

FIG. 4 is a sectional view taken along line 4—4 of FIG. 3;

FIG. 5 is a sectional view taken along line 5—5 of FIG. 3;

FIG. 6 is a perspective view of a slot liner and pivot pin used in pivoting the rear end of the pedal key of this invention;

FIG. 7 is an elevation view of a slot liner in position in a slot in the rear rail which rear rail is shown in section;

FIG. 8 is a sectional view taken along line 8—8 of FIG. 2;

FIG. 9 is a sectional view taken along line 9—9 of FIG. 8;

FIG. 10 is a perspective view of a resilient stop positioned on the metal key base;

FIG. 11 is an end elevational view of the front end of the key and actuator; and FIG. 12 is a side elevation detailed view of the front end of the key base and actuator showing a mounting cap in section.

A pedal board 10, as shown in FIG. 1, may be of the general type and configuration shown in my Patent 3,175,447, granted March 30, 1965, especially with regard to the "toe in" of the metal base keys, general size and shape. Therefore, only a portion of the pedal sufficient for the understanding of the invention has been shown in FIG. 1.

The pedal board 10 includes a rear rail cover 14 and a front rail cover 16 closest to the organ. Attached to the rear rail cover on the underside thereof is a slotted metal pivot rail 18 of generally L-shaped section as shown in FIG. 2, and a slotted metal guide rail 20 of channel shaped section is attached to the front rail cover.

As shown in FIG. 3, the rear pivot rail 18 has a plurality of generally key-shaped parallel slots 22, and as shown in FIGS. 8 and 9, the front rail 20 has a corresponding plurality of pedal slots 24. The rear rail slots 22 support a pivot means for pedal keys 26 while the front rail slots 24 provide guide means for the pedal keys.

The pedal keys 26 shown in FIG. 1 include a metal base or support member 28 and suitable key covers or caps 30 which could be of the nature disclosed in my aforesaid Patent 3,175,447. Since all of the key bases 28 may be identical, only one will be described in detail.

Each pedal key is pivoted for movement about pivot point 32 in the rear pivot rail 18 as shown in FIG. 2. The pivot point is provided by a slot liner 34, as shown in perspective in FIG. 6, for lining slot 22 and by pivot pin 36 extending through a hole 38 in key base 28 and a corresponding hole 40 in the slot liner 34. As shown in FIG. 6, for example, the slot liner 34 has in it a passage 41, longer than the height of the key base 28 to allow pivotal movement. In addition, the slot liner 34 has side grooves 42 at its top and side grooves 43 near its bottom, together with a ledge 45 to allow orientation of the slot liner 34 in slots 22.

Slots 22 have an enlarged opening 46 at the top thereof, which opening is larger than top portion 44 of the slot liner 34. This allows the slot liner to be inserted and removed through the large head opening 46 in the slot 22. The pedal key base 28, slot liner 34 and pivot pin 36 may be assembled and the slot liner inserted into slot 22 through large opening 46 and seated in grooves 42 and 43 against ledge 45.

For holding the slot liner 34 down in the slot there is provided a key cap 48 having side grooves 50, 50 and front and rear end grooves 52, 52. The end grooves allow the legs of the key cap to be squeezed together (preferably by a special tool) so that it may be inserted and removed by diminishing the distance between grooves 50, 50 for removing from its position in the rail slot shown in FIG. 4. Once the key 48 is inserted, it cannot be removed without the use of a tool (not shown) to squeeze together the legs and allow its removal. Another means of holding the slot liner down in the slot is an integral extension and projection 47, FIG. 6, which extends down and into a corresponding cut-out 49 in the bottom of rail 18, as shown in FIG. 7.

Referring now to the front rail 20, the slots 24 therein have flanges 54 on their sides for guide purposes. At the point on the key base 28 where it passes through a slot 22, felt 56 is positioned on the key base to further prevent noise.

In order to provide a noiseless stop there is bumper 60 of resilient material such as Geon positioned on the key 28. The bumper is shown in perspective in FIG. 10 and includes bulbous ends 62 with energy absorbing holes 63 therein and a lug 65 extending into a slot 67 in the bumper 60. As shown in FIG. 2 the key base 28 includes an elongated hole 58 for accommodating lug 65 and for positively locating bumper 60. Also as shown in FIG. 2, the ends of bumper 60 when so located cooperate with the edges of the channel shaped rail 20 to accomplish quiet and effective stopping action.

The front end of pedal key base 28 closest to the organ includes a plastic end cap 64 fitting snugly thereon, see FIGS. 2, 11 and 12. The end cap has a projection 70, having a vertical hole therein for accommodating a wire-like actuator 66 and a transverse threaded hole therein for set screw 68. The actuator 66 of each pedal may be of a suitable length for actuating mechanism 71 as known in the art, such as a keying device or the like. By means of set screw 68 the actuator can be adjusted for height and locked. A return spring 72 is attached to a hole 74 in a tab 75 from the end cap 64 and to a rigid support 77, so that the spring 72 normally urges the pedal key base 28 against the upper stop leg of channel 20 as shown in FIG. 2. As is known, upon an organist pressing down on any pedal 26 against the bias of spring 72, the pedal moves down and the actuator 66 actuates keying device 71.

Positive and quiet pivotal control of pedal movement is thus provided by the slot liner 34 and pivot pin arrangement. While key 48 or projection 47 allows quick and efficient removal. End cap 64 allows different length actuators of an inexpensive wire construction to be used. And resilient stop 60 contributes to the noiselessness of the construction.

While the invention has been particularly shown and described with reference to a preferred embodiment thereof, it will be understood by those skilled in the art that various changes in form and details may be made therein without departing from the spirit and scope of the invention.

What is claimed is:
1. In a pedal board for organs of the type including a front and a rear rail, a plurality of pedal keys pivotally supported adjacent one end thereof from the rear rail and guided for vertical movement by the front rail, with actuating means attached to the pedals adjacent the front end thereof, the improvements comprising; slot liners shaped to line slots in the rear rail, each slot liner including an elongated passage therethrough for accommodating pivotal movement of a metal pedal base and a pivot pin hole transverse to the passage, a pivot pin positioned in the hole and extending through the pedal base, and means to lock the slot liner in the rear rail slot, the locking means allowing removal of the slot liner so that the slot liner and corresponding pedal can be quickly and easily removed.

2. A pedal board as defined in claim 1 wherein the locking means comprises a removable key also positionable in the slots above the slot liner.

3. A pedal board as defined in claim 1 wherein the locking means include an extension of the slot liner extending to cooperate with a portion of the rear rail to accomplish the locking, and being bendable out of locking engagement with the rear rail.

4. A pedal board as defined in claim 1 wherein the actuating means includes an end cap secured to the front end of the pedal base and having a hole therein for accommodating a wire-like actuator, together with a set screw for locking the actuator in adjusted position.

5. A pedal board as defined in claim 4 wherein the end cap also includes an ear for attachment of a return spring.

6. A pedal board as defined in claim 1 the further improvements comprising a resilient bumper having an elongated passage therein for the pedal key to extend therethrough, the bumper including enlarged ends with energy absorbing holes extending through the ends and a lug for locking on a window formed in the pedal base.

7. A pedal board as defined in claim 6 wherein the front rail slots include slot guide tongues formed integrally with the rail for cooperating with a liner positioned over the metal key base.

References Cited by the Examiner
UNITED STATES PATENTS
3,175,447  3/1965  Klann _____ 84—366

RICHARD B. WILKINSON, *Primary Examiner.*